(12) United States Patent
Nagahama

(10) Patent No.: US 6,252,752 B1
(45) Date of Patent: Jun. 26, 2001

(54) OVERLOAD PROTECTION APPARATUS AND A SPEED REDUCER HAVING SUCH AN APPARATUS

(75) Inventor: Tsuneo Nagahama, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/433,981

(22) Filed: Nov. 4, 1999

(30) Foreign Application Priority Data

May 2, 1999 (JP) .................................................. 11-029368

(51) Int. Cl.[7] ...................................................... H02H 5/04

(52) U.S. Cl. .................................. 361/31; 361/24; 361/29

(58) Field of Search ............................ 361/23, 24, 28–31, 361/93.1, 94, 100; 318/434, 453, 484

(56) References Cited

U.S. PATENT DOCUMENTS

| 3,609,461 | * | 9/1971 | Obenhaus et al. ...................... 361/94 |
| 4,065,804 | * | 12/1977 | Rostad ................................... 361/96 |
| 5,719,732 | | 2/1998 | Nagahama et al. . |
| 5,828,309 | * | 10/1998 | Kumakura et al. ................... 340/658 |

* cited by examiner

*Primary Examiner*—Michael J. Sherry
(74) *Attorney, Agent, or Firm*—Helfgott & Karas, P.C.

(57) ABSTRACT

A semiconductor switch is installed in a power supply line of a motor, and photocouplers, which constitute a switching control circuit for turning on and off the semiconductor switch, are series-connected between a constant-voltage source and the output ends of a comparator of a starting circuit and a comparator of a trip circuit. An overload at the time of starting the motor is detected by a current transformer, and the semiconductor switch is activated so as to readily cut off the motor driving current.

8 Claims, 11 Drawing Sheets

OVERLOAD PROTECTION APPARATUS AND A SPEED REDUCER HAVING SUCH AN APPARATUS

BACKGROUND OF THE INVENTION

The present invention relates to an overload protection apparatus for protecting a motor and a driving mechanism driven by the motor from an overload, and concerns a speed reducer provided with such an apparatus.

FIG. 1 is a circuit diagram that shows a feeder circuit for a three-phase motor and a conventional overload protection apparatus for protecting a driving mechanism driven by the three-phase motor from an overload, and respective lines from a three-phase power source of R, S and T phases, not shown, are connected to three lines of U, V and W phases respectively connected to three terminals of a motor M with a molded case circuit breaker (CB) 91 interpolated in between. The respective lines of U, V and W phases are connected to the three-phase motor M for driving, for example, a conveyor belt, with a electromagnetic contactor (MC) 92 interpolated in between. The lines of U and W phases, which connect the electromagnetic contactor 92 and the three-phase motor M, are provided with thermal relays (OCR) 93, and the line of W phase is further provided with a current transformer 94. The output of the current transformer 94 is inputted to the input terminals k and l of an overload protection apparatus 90. The overload protection apparatus 90 is interpolated between the U-phase line and the W-phase line, and between the b terminal of the overload protection apparatus 90 and the W-phase line are interpolated a push button switch for stopping 95, a parallel circuit between a push button switch for starting 96 and an electromagnetic contactor 92, and a series circuit consisting of the electromagnetic coil of the electromagnetic contactor 92 and a normally-closed contact of a thermal relay 97.

The following description will discuss the operation of such an overload protection apparatus 90. When the push button switch for starting 96 is closed with the molded case circuit breaker 91 being closed, the electromagnetic coil of the electromagnetic contactor 92 is excited, the electromagnetic contactor 92 is closed, and three-phase currents are allowed to flow through the three-phase motor M so that the motor M is started. Here, the current transformer 94 detects the motor currents, and the resulting output is inputted to the overload protection apparatus 90, with the result that the overload protection apparatus 90 obtains an output voltage V that is proportional to the motor driving current I. Then, the overload protection apparatus 90 compares the levels of the output voltage V and a starting detection reference voltage E1, and when V>E1, detects the starting of the three-phase motor M.

After a predetermined time has elapsed from the detection of the starting, the output voltage V obtained by the overload protection apparatus 90 and an overload detection reference voltage E2 are compared in their levels, and when V>E2, time counting is started, and after a predetermined time has been counted, the electromagnetic coil is demagnetized, with the result that the electromagnetic contactor 92 is opened, and the motor driving current I is cut off so that the motor M is stopped; thus, the motor and the driving mechanism are protected from the overload.

However, in the conventional overload protection apparatus of this type, the voltage V that is proportional to the motor driving current I is detected, and this is compared with the overload detection reference voltage E2 that has been preliminarily set, and if the voltage V exceeds the reference voltage E2, it is judged as an overload so that a trip signal is outputted; thus, the electromagnetic contactor 92 for opening and closing the power supply line to the motor M is allowed to open by the trip signal so that the motor driving current is cut off.

However, the following problems arise in the conventional arrangement as described above.

(1) Since the motor driving current is cut off by disconnecting the power supply line by using the electromagnetic contactor 92, a complex wiring job is required upon installing the overload protection apparatus 90.

(2) It is difficult to install the overload protection apparatus in a motor driving system without the electromagnetic contactor 92, such as a motor driving system using a knife switch or a push button switch.

(3) In the driving mechanism driven by a motor, in the case of a low ambient temperature, an increased motor output torque is required for driving due to high viscosity in the grease, etc., and an increased motor driving current is consequently required. Therefore, in the case of a lower ambient temperature as compared with the temperature at the time of the setting of the overload detection reference value of the overload protection apparatus, there is a possibility that the overload protection apparatus might trip unnecessarily.

BRIEF SUMMARY OF THE INVENTION

One of the objects of the present invention is to provide an overload protection apparatus with a semiconductor switch for cutoff of the power supply which allows a cutoff of a motor driving current even in a power-connecting state, makes it possible to simplify the wiring process, and is easily installed even in the case of the application of a knife switch or a push button switch, and also to provide a speed reducer provided with such an overload protection apparatus.

Another object of the present invention is to provide an overload protection apparatus which can detect an overload accurately, and readily address the overload by compensating for variations in the overload detection reference value due to temperature variations, and also to provide a speed reducer having such an overload protection apparatus.

The overload protection apparatus of the present invention is provided with: a semiconductor switch installed in a power supply line for a motor; an overload detection circuit having a current detector, installed in the power supply line, for detecting a motor driving current, an overload detection reference value setting circuit for setting an overload detection reference value and a first operational amplifier for comparing a voltage that is proportional to the motor driving current detected by the current detector with the overload detection reference value set by the overload detection reference value setting circuit, and for outputting a signal corresponding to the result of the comparison; a starting circuit having a first comparator for comparing a voltage corresponding to the motor driving current upon starting the motor with a first reference value that is a reference voltage at the time of starting the motor, and for outputting a signal corresponding to the result of the comparison; a trip circuit having a second operational amplifier for comparing a value of integration obtained by integrating an output of the first operational amplifier with a second reference value, and for outputting a signal corresponding to the result of the comparison, and a second comparator for comparing an output of the second operational amplifier with the first reference value, and for outputting a signal corresponding to the result of the comparison; and a switch operation circuit, installed between a constant-voltage source and an output end of the second comparator and/or an output end of the first comparator, for outputting a signal in response to the outputs of the first and second comparators so as to open and close the semiconductor switch.

In the overload protection apparatus of the present invention, the motor driving current is cut off by the semiconductor switch at the time of an overload so that the motor driving current can be cut off at a higher speed as compared with the conventional electromagnetic contactor; thus, it is possible to reduce damage in the event of an overload trip.

Moreover, the overload detection reference value setting circuit is provided with a temperature-sensitive resistor and a variable resistor that are series-connected to a constant-voltage source. Therefore, the overload detection reference value can be compensated in response to ambient temperature so that it is possible to detect an overload more accurately and consequently to reduce an unnecessary trip at the time of a low ambient temperature.

Moreover, the switch operation circuit for outputting a signal for opening and closing the semiconductor switch is provided with a photocoupler. Therefore, it is possible to simplify the wiring.

Furthermore, the starting circuit is provided with a comparator for comparing the first reference value that is a reference voltage at the time of starting with a charging voltage to a capacitor that is inputted from a series-connecting point between a resistor and the capacitor that are connected to a constant-voltage source so as to output a predetermined signal for a period until the charging voltage has exceeded the first reference value. Thus, even if a starting current exceeding the rated current at the time of starting is detected as an overload, no trip occurs, and the motor can be started.

Moreover, in a speed reducer which reduces the number of revolutions of a motor connected to an input shaft, and outputs the resulting torque to a load side, the above-mentioned overload protection apparatus is housed inside a motor terminal box. Therefore, since the overload protection apparatus is housed inside the motor terminal box, it is not necessary to provide a specific housing, etc., an inspection and an exchange in the event of an abnormality can be carried out easily, and no complexity arises even if the overload protection apparatus is installed.

The above and further objects and features of the invention will more fully be apparent from the following detailed description with accompanying drawings.

DETAILED DESCRIPTION OF THE INVENTION

Referring to Figures, the following description will discuss embodiments of the present invention.

Figure 1:
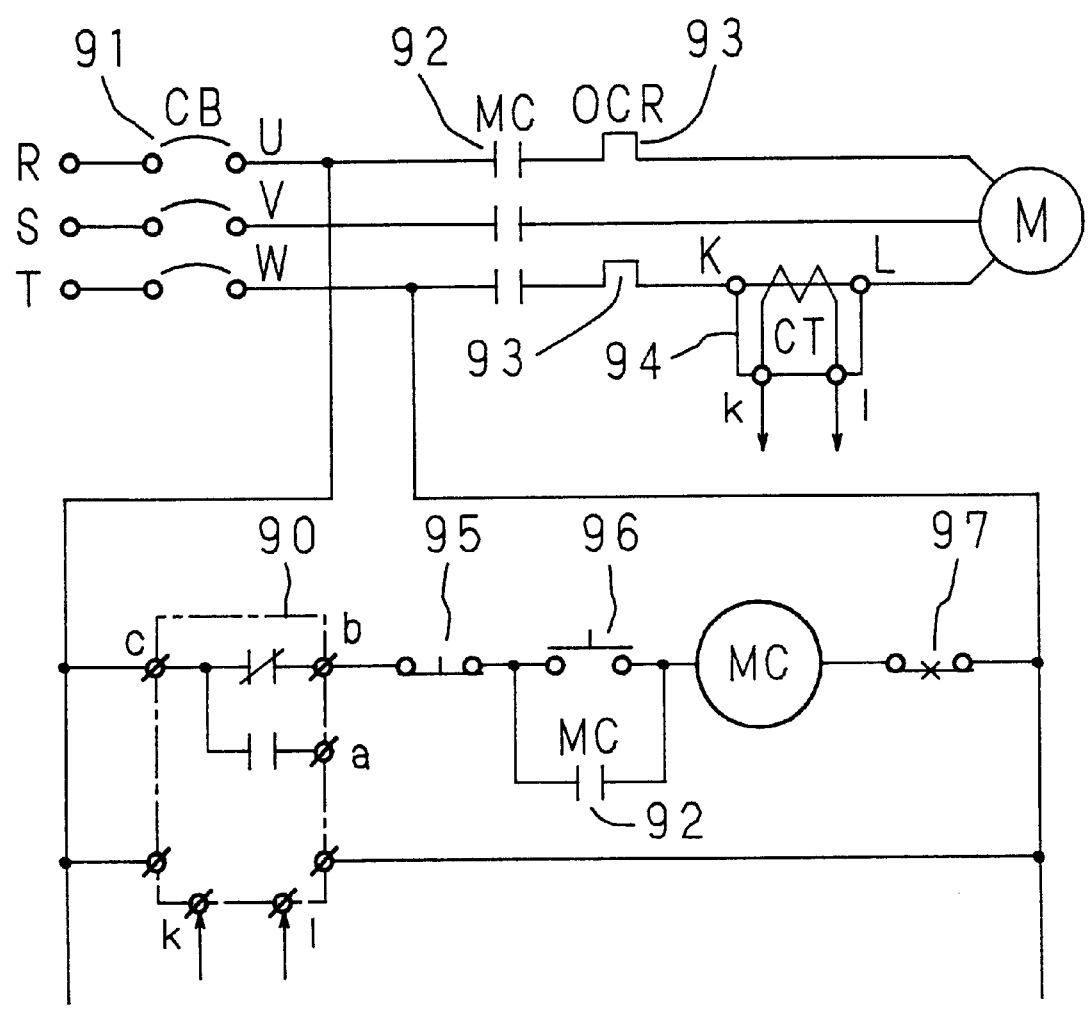
FIG. 1 is a circuit diagram that shows a feeder circuit for a motor and a conventional overload protection apparatus attached thereto.
Figure 2:
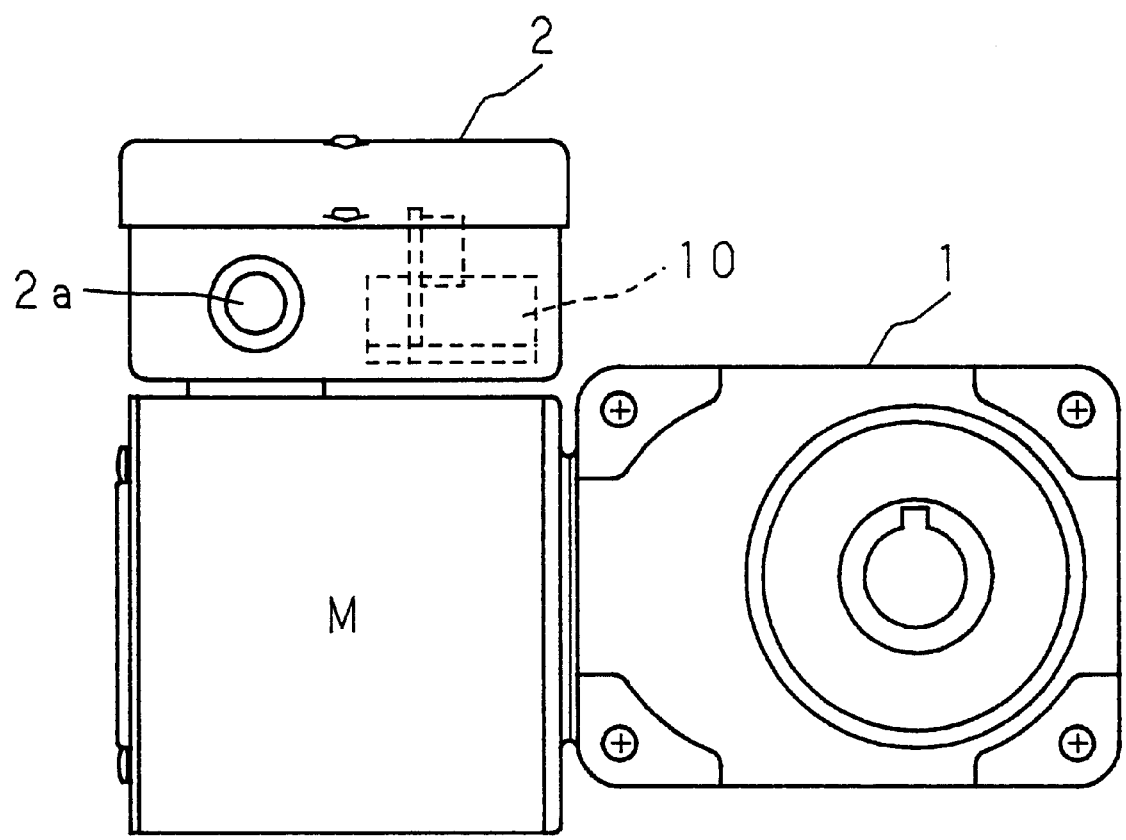
FIG. 2 is a front view that shows the construction of a speed reducer provided with an overload protection apparatus.
Figure 3A:
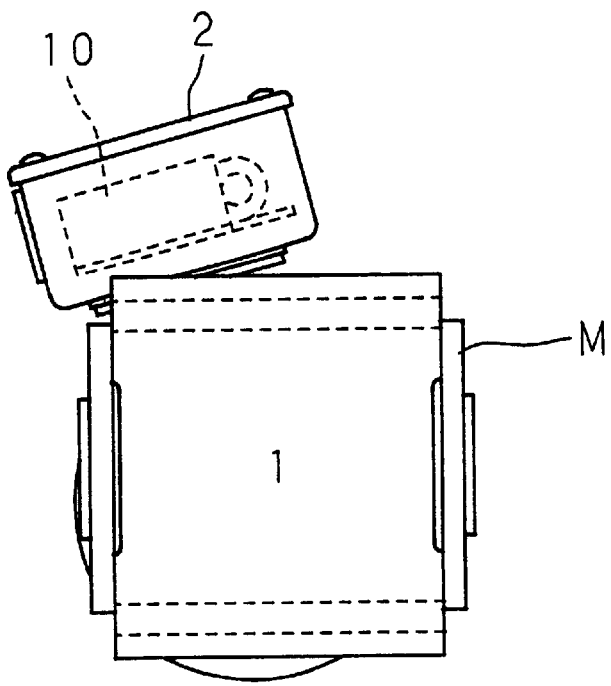
FIG. 3A is a right-side view of FIG. 2.
Figure 3B:
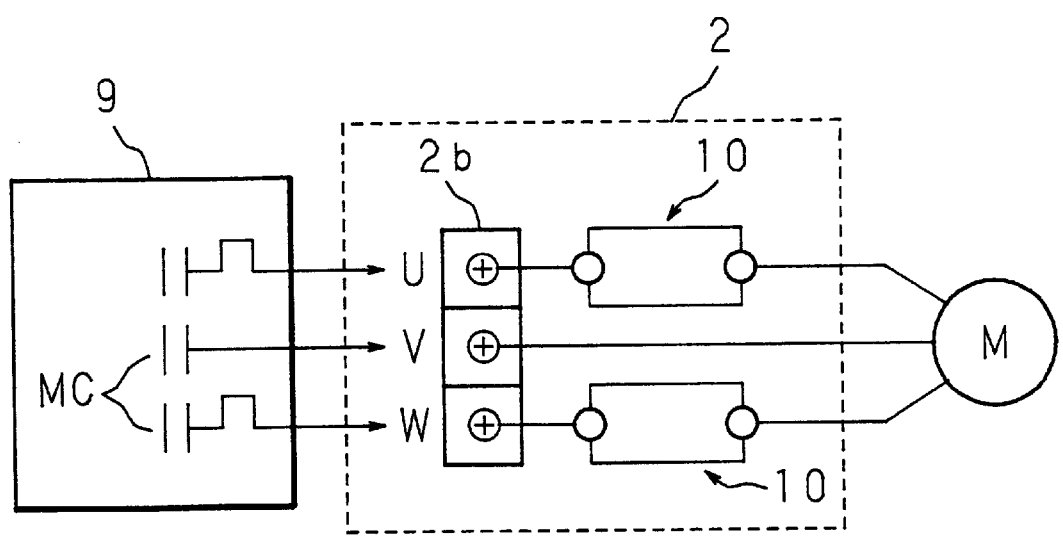
FIG. 3B is an explanatory drawing that shows an electrical connection between a motor and a control panel as well as a terminal box.

FIG. 2 is a schematic front view that shows a speed reducer provided with an overload protection apparatus that is one embodiment of the present invention; FIG. 3A is a right side view of FIG. 2; FIG. 3B is an explanatory drawing that shows an electrical connection between a control panel and a terminal box as well as a motor, in which M represents the motor, reference numeral 1 is the speed reducer, 2 is the motor terminal box and 9 represents the control panel. In the same manner as the conventional feeder circuit shown in FIG. 1, three lines from a three-phase power source having three phases of R, S and T, not shown, are introduced into the control panel 9. Inside the control panel 9, an electromagnetic contactor MC is interpolated in each of the lines, and is connected to each end of external wires. Each of the other ends of the external wires is connected to a terminal base 2b inside the terminal box 2 that is attached to an outer housing of the motor M. Each end of three-phase lines U, V and W, connected to the three terminals of the motor M, is connected to the terminal base 2b, and in the middle of the U and W phase lines is interpolated the overload protection apparatus 10 in accordance with the present invention. Reference numeral 2a is a wiring hole that is opened in the terminal box 2.

Figure 4:
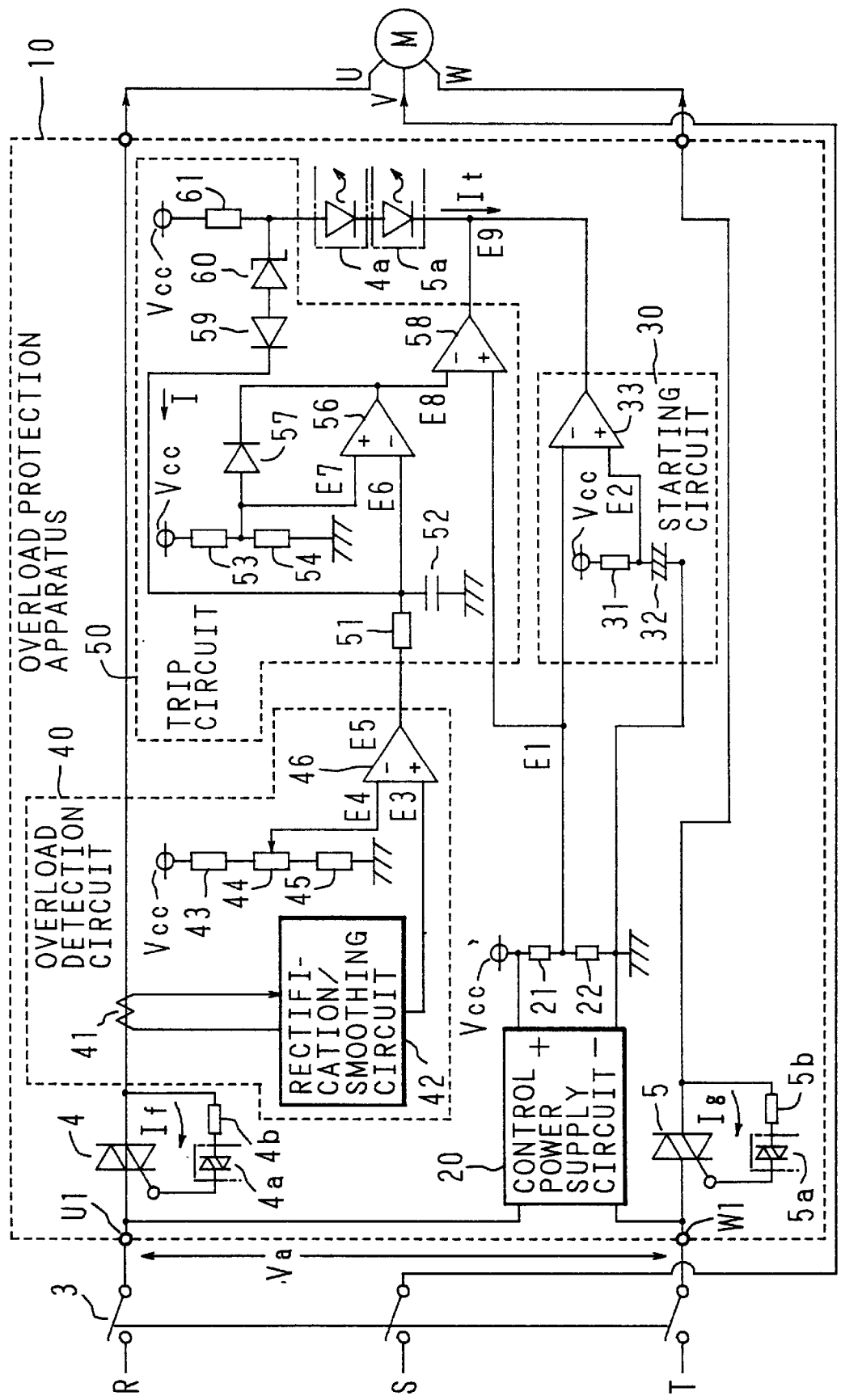
FIG. 4 is a circuit diagram of the overload protection apparatus.

FIG. 4 is a circuit diagram that shows a feeder circuit to the motor M and the overload protection apparatus 10 attached thereto, and a three-phase power source, not shown, is connected to the three terminals U, V and W of the three-phase motor M in a driving mechanism for a conveyor belt, etc. through the three-phase lines R, S and T so that a motor driving current is supplied to the three-phase motor M through these lines. Moreover, a breaker (knife switch) 3 is interpolated in each of the three-phase lines so as to cut off these lines at once, semiconductor switches 4 and 5 are interpolated in the respective R and T phase lines, a control power supply circuit 20 is installed in the R and T phase lines, and a current transformer 41, constituting an overload detection circuit 40, is installed in the R phase line.

The semiconductor switches 4 and 5 are respectively provided with photocouplers 4a and 5a and resistors 4b and 5b that are series-connected thereto; thus, when the photocouplers 4a and 5a turn on, a gate current If or Ig is allowed to flow these series circuits, and when these are applied to the gate of the semiconductor switches 4 or 5, the semiconductor switch 4 or 5 is turned on, thereby allowing the respective R and T phase lines to conduct. In contrast, when the photocouplers 4a and 5a are turned off, the semiconductor switches 4 and 5 are turned off, with the result that the respective R and T phase lines are disconnected and the motor driving current is cut off. The photocouplers 4a and 5a are series-connected together with a resistor 61 between a constant voltage source (voltage Vcc) and the output terminals of comparators 33 and 58, which will be described later; thus, in the case when the outputs of the comparators 33 and 58 become low (where the open collector outputs of the comparators 33 and 58 are allowed to conduct), a current It flows through the photocouplers 4a and 5a so that the photocouplers 4a and 5a are turned on, and in the case when the outputs of the comparators 33 and 58 become high (where the open collector outputs of the comparators 33 and 58 are not conductive), the photocouplers 4a and 5a are turned off.

Moreover, the control power supply circuit 20 is a circuit which reduces, rectifies, smooths and stabilizes a rated voltage Va of three-phases so that a controlling dc constant voltage supply (voltage Vcc) is obtained, and resistors 21 and 22 are series-connected between the constant voltage source (voltage Vcc) thus obtained and a low voltage source (earth potential), with the midpoint of the two resistors 21 and 22 being connected to the minus terminal of the comparator 33 of the starting circuit 30 and also to the plus terminal of the comparator 58 of the trip circuit 50.

When the breaker 3 is closed and the rated voltage (ac voltage) Va is applied across the input terminals U1 and W1 of the overload protection apparatus 10 from the three-phase power source, the constant voltage supplies (voltage Vcc) are allowed to rise, and a reference value voltage E1, voltage-divided by the resistors 21 and 22, is applied from the midpoint of these to the minus terminal of the comparator 33 in the starting circuit 30 and the plus terminal of the comparator 58 in the trip circuit 50. The starting circuit 30 is provided with a series circuit of a resistor 31 and a capacitor 32 that is placed between the constant voltage source (voltage Vcc) and the low voltage source (earth potential), together with the comparator 33, and a charging voltage E2, which is being charged to the capacitor 32 from the midpoint between the resistor 31 and the capacitor 32, is inputted to the plus terminal of the comparator 33.

Since a current greatly exceeding the rated current, that is, the motor starting current, is allowed to flow at the time of starting the motor M, the reference voltage E1 and the charging voltage E2 are set so as to maintain the output of the comparator 33 in a low level for a time period longer than the time in which the starting current has become stabilized from the starting of the motor M, so as not to cause an overload trip when the motor M is started normally.

The comparator 33 compares the reference voltage E1 and the charging voltage E2, and from the time at which the constant power supply (voltage Vcc) has risen until the charging voltage E2 of the capacitor 32 has exceeded the reference value voltage E1, the open collector output of the comparator 33 is allowed to conduct (where the output goes low), thereby allowing the voltage E9 to become low. As a result, the current It flows through the photocouplers 4a and 5a via the resistor 61, and the base currents If and Ig are allowed to flow through the resistors 4b and 5b respectively series-connected to the photocouplers 4a and 5a, with the result that the semiconductor switches 4 and 5 are turned on, the lines R, S and T of the three-phase power source are connected to the terminals U, V and W of the motor M, and the motor M is started.

The time during which the open collector output of the comparator 33 is allowed to conduct (where the output goes low) is set longer than the time in which the starting current of the motor M has returned to the constant current so that the overload detection circuit 40 and the trip circuit 50, which will be described later, are actuated by the starting current at the time of starting of the motor M so as to prevent the current It to the photocouplers 4a and 5a from being cut off, even when the open collector output of the comparator 58 becomes non-conductive (where the output goes high); therefore, the characteristic constants of the resistor 31 and the capacitor 32 are determined so as to achieve this arrangement.

The overload detection circuit 40 is provided with a current transformer 41, a rectification/smoothing circuit 42, a temperature-sensitive resistor 43, a variable resistor 44, a fixed resistor 45, an operational amplifier 46, etc. A voltage E3, which is proportional to the motor driving current that has detected by the current transformer 41 and dc-converted by the rectification/smoothing circuit 42, is inputted to the plus terminal of the operational amplifier 46, and an overload detection reference value E4, set by the overload detection reference value setting circuit, is inputted to the minus terminal thereof.

Figure 5:
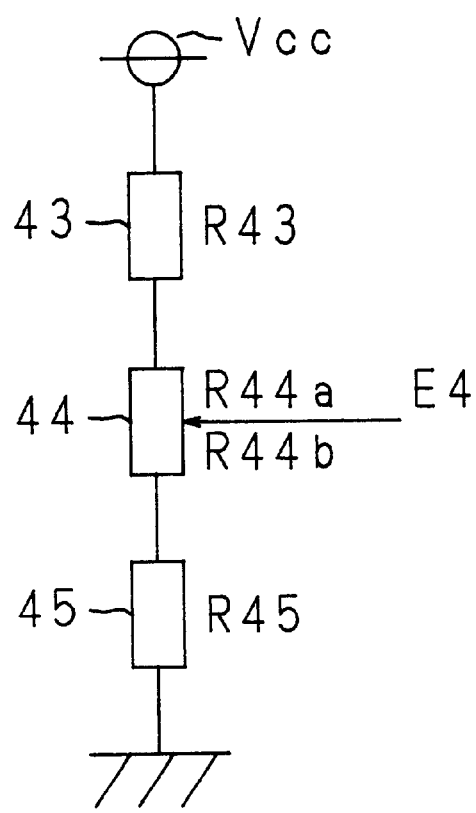
FIG. 5 is an explanatory drawing that shows a setting circuit for an overload detection reference value E4 in an overload detection circuit in the overload protection apparatus.

FIG. 5 is an explanatory drawing that shows the overload detection reference value setting circuit in the overload detection circuit 40, and the overload detection reference value setting circuit is constructed by series-connecting the temperature-sensitive resistor (R43: resistance value) 43, the variable resistor (R44a, R44b: resistance value) 44 and the fixed resistor (R45: resistance value) 45 between the constant voltage source (voltage Vcc) and the low voltage source (earth potential); here, the overload detection reference value E4 is given by the following equation:

$$E4=(R45+R44b)Vcc/(R43+R44a+R44b+R45)$$

R44a: resistance value of the variable resistor 44 on the plus side

R44b: resistance value of the variable resistor 44 on the minus side

In other words, the overload detection reference value E4 is set by the variable resistor 44, and as ambient temperature varies from the temperature at the time of setting, the resistance value of the temperature-sensitive resistor 43 varies so that it is automatically compensated.

Figure 6:
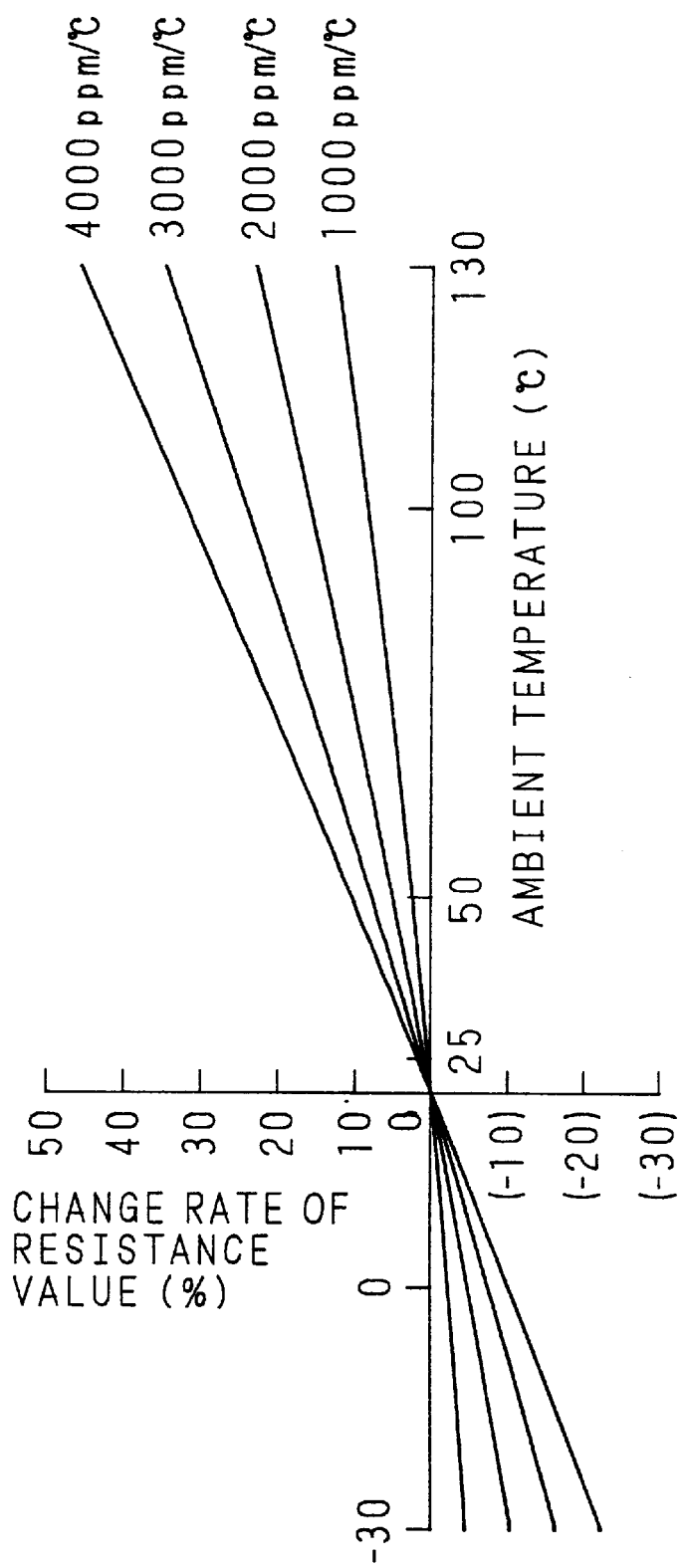
FIG. 6 is a drawing that shows the characteristic of a temperature-sensitive resistor.

FIG. 6 is a characteristic diagram that shows the relationship (linearity) between the change rate of resistance value (%) of the temperature-sensitive resistor 43 and ambient temperature (° C.) for each standard value, and ambient temperature (° C.) is given on the axis of abscissa and the change rate of resistance value (%) is given on the axis of ordinate. In this characteristic diagram, the respective standard values 1000 to 4000 ppm/° C. are given as following equation:

$$\{R2-R1/R1(t_2-t_1)\} \times 10_6 \text{ (ppm/° C.)}$$

where R1: resistance value of variable resistor 44 at temperature $t_1$ at the time of setting R2: resistance value of variable resistor 44 at varied temperature $t_2$ after setting It is found that although the change rate of resistance value (%) varies for each standard value in the range of 1000 to 4000 ppm/° C., a good linearity is obtained for each of the standard value within the range of −30° C. to 130° C.

Figure 7:
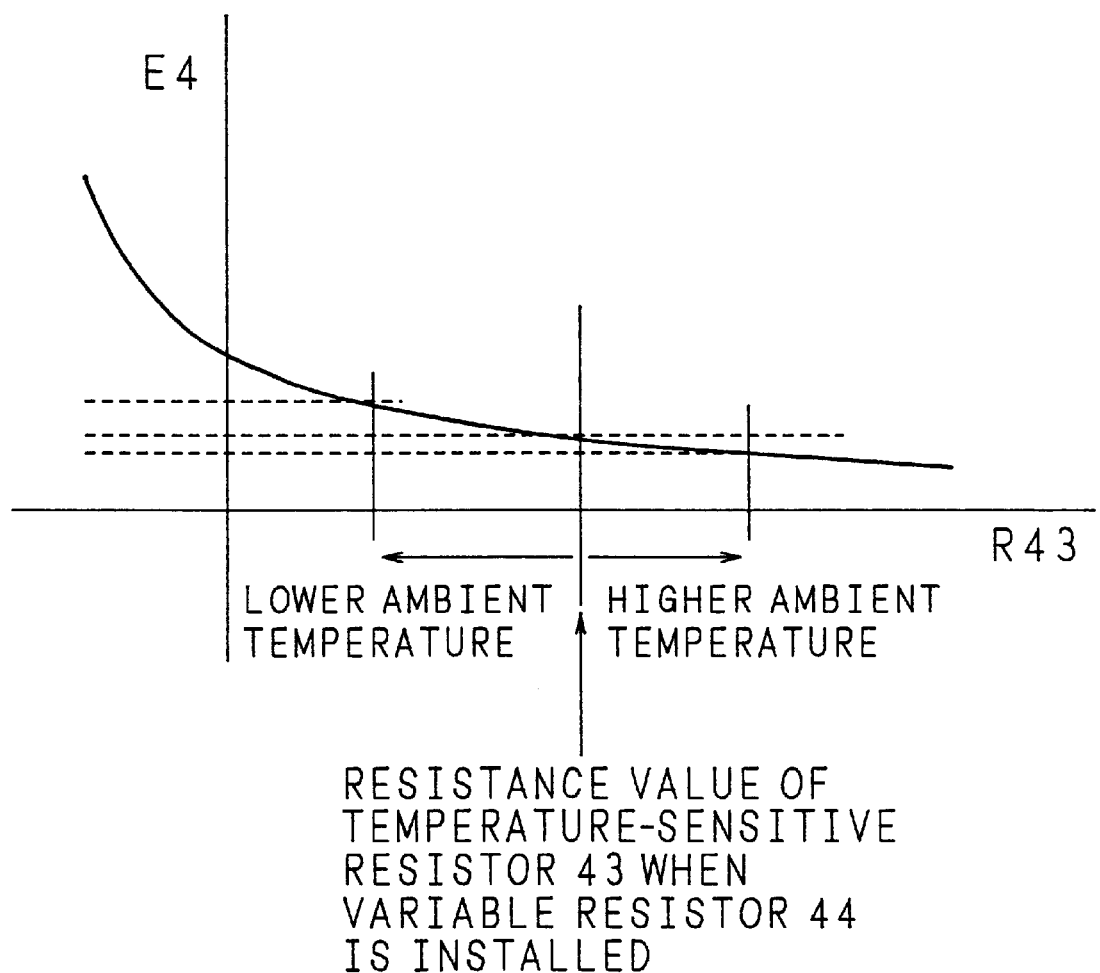
FIG. 7 is a graph that shows the characteristics of the overload detection reference value E4 and the resistance value R43 of the temperature-sensitive resistor.

FIG. 7 is a graph that shows the characteristics of the overload detection reference value E4 and the resistance value R43 of the temperature-sensitive resistor 43, and the resistance value R43 of the temperature-sensitive resistor 43 is given on the axis of abscissa and the overload detection reference value E4 is given on the axis of ordinate. As clearly shown by the graph, when ambient temperature drops from the ambient temperature at the time of setting the variable resistor 44, the resistance value R43 of the temperature-sensitive resistor 43 becomes smaller, thereby making the overload detection reference value E4 of the overload detection circuit 40 higher. When ambient temperature becomes higher, the resistance value R43 of the temperature-sensitive resistor 43 becomes greater, thereby making the overload detection reference value E4 of the overload detection circuit 40 lower. With this arrangement, it is possible to avoid the occurrence of an unnecessary trip since the overload detection reference value E4 also becomes higher, even if, even under the same load, the motor driving current becomes greater at a low temperature as compared with that at a high temperature.

The operational amplifier 46 compares the voltage E3 that is proportional to the motor driving current with the overload detection reference value E4, and for example, in the case of E3>E4, that is, the voltage E3 that is proportional to the motor driving current exceeds the overload detection reference value E4 at the time of starting or in the event of an overload, an output voltage E5 of a high level is outputted to the trip circuit 50, while in the case of E3≦E4, the output voltage E5 of a low level is outputted thereto. The trip circuit 50 is constituted by an integrator consisting of a resistor 51 and a capacitor 52, resistors 53, 54 and 61, diodes 57 and 59, a Zener diode 60, an operational amplifier 56, a comparator 58, etc.

The output of the operational amplifier 46 is inputted to the integrator consisting of the resistor 51 and the capacitor 52, and a value of integration E6, which is an output thereof, is inputted to one terminal of the operational amplifier 56. A series circuit consisting of the resistor 61, the Zener diode 60 and the diode 59 is interpolated between the junction of the resistor 51 and the capacitor 52 forming the integrator and the constant power source (voltage Vcc), and a predetermined voltage is applied to the output end of the operational amplifier 46 through the resistor 51. The midpoint of the series circuit of the resistors 53 and 54 interpolated between the constant voltage source (voltage Vcc) and the low voltage source (earth potential) is connected to the plus terminal of the operational amplifier 56, and a voltage E7, voltage-divided by the resistors 53 and 54, is inputted thereto. The resistors 51, 53, 54, the capacitor 52 and the diode 57 constitute a delay circuit (delay time: 20 to 40 msec), and the voltage E7 is set to such a value as to prevent an unnecessary overload trip due to an instantaneous over current. Moreover, the above-mentioned midpoint is connected to the output end of the operational amplifier 56 and the minus terminal of the comparator 58 with the diode 57 interpolated in between.

The operational amplifier 56 compares the inputted value of integration E6 and the voltage E7, and releases an output voltage E8. Here, in the case of E6≦E7, it outputs a signal in a high level, and in the case of E6>E7, it outputs a signal in a low level. When the output voltage E8 goes low, the diode 57 is allowed to conduct, and the voltage E7 drops to a level that is higher than the output voltage E8 of the operational amplifier 56 that goes low, by a value corresponding to a forward voltage of the diode 57. The comparator 58, which has the reference voltage E1 voltage-divided by the resistors 21 and 22 that is inputted through its plus terminal and the output voltage E8 of the operational amplifier 56 that is inputted through its minus terminal, compares the two voltages, and the output thereof, that is, the open collector output thereof, becomes conductive or non-conductive based upon the result of the comparison (where the output goes low or goes high).

Figure 8:
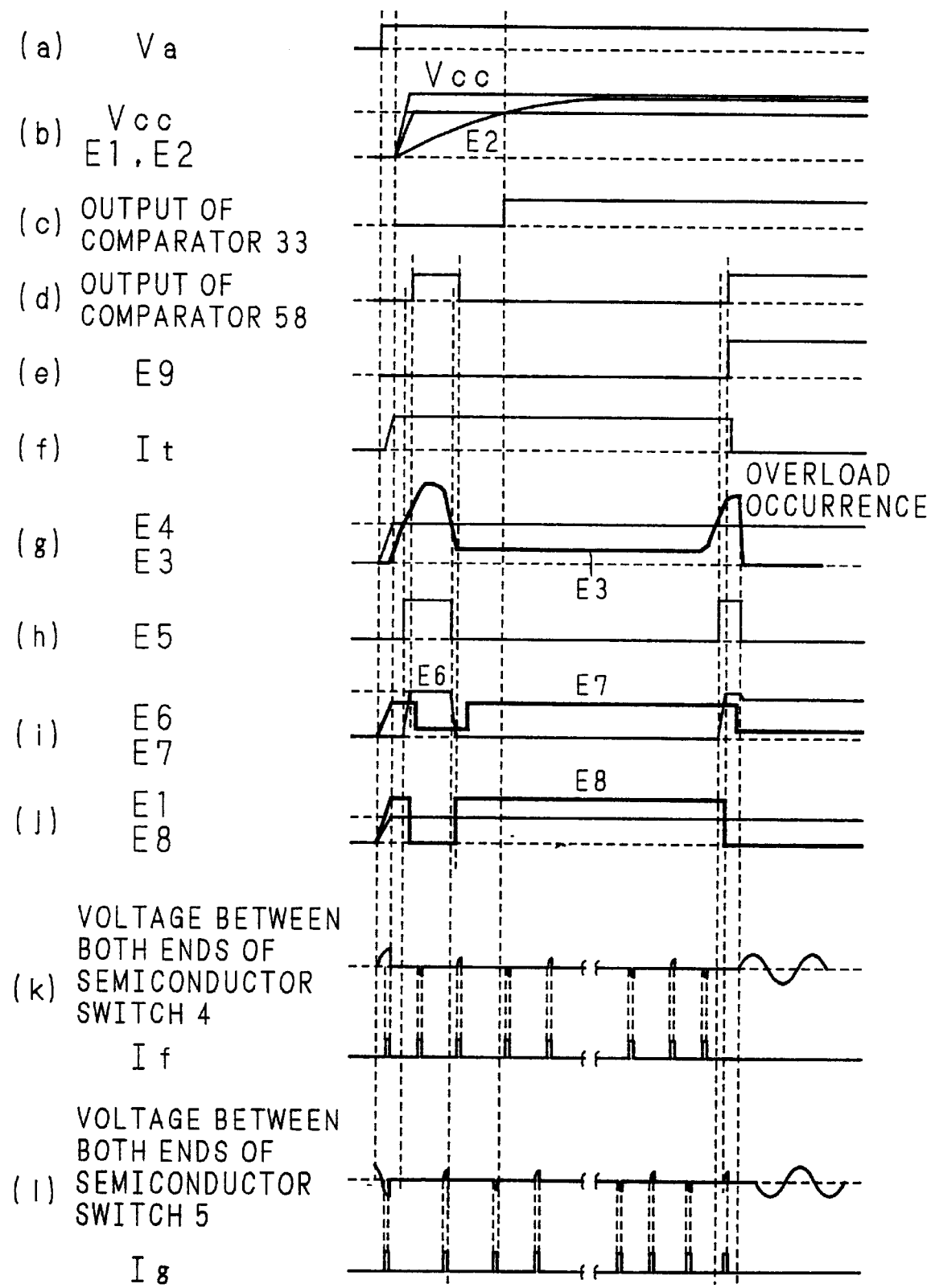
FIG. 8 is a timing chart of the overload protection apparatus.
Figure 9:
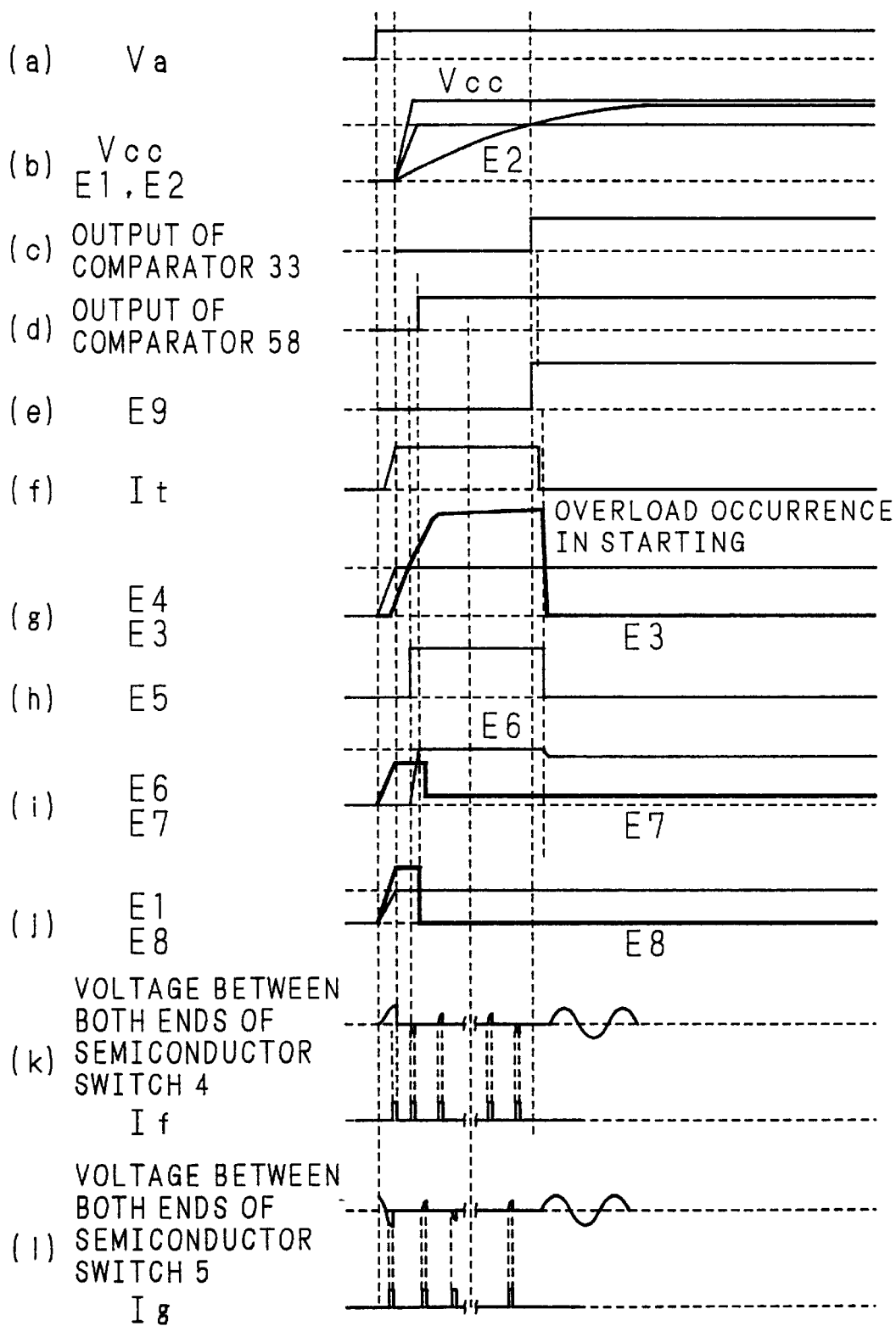
FIG. 9 is a timing chart of the overload protection apparatus.

Next, referring to timing charts shown in FIG. 8 and FIG. 9, an explanation will be given of the operations of the motor M at the time of starting and after having been driven, in a normal operation time and in the event of an overload respectively.

(a) Operation of the Motor M at the Time of Starting

Upon closing the breaker 3, the rated voltage Va is applied (FIG. 8(a)), the constant voltage supply (voltage Vcc) is allowed to rise by the control power supply circuit 20, and the reference voltage E1 is then allowed to rise, with the result that the charging voltage E2 is allowed to rise with a delay (FIG. 8(b)). The output of the comparator 33 is maintained low until the charging voltage E2 has exceeded the reference voltage E1 (FIG. 8(c)), and once it has exceeded the reference voltage E1, it is maintained high thereafter.

Since the starting current that greatly exceeds the rated current is allowed to flow at the time of starting the motor M, the voltage E3 that is proportional to the motor driving current obtained by the detection and conversion of the current transformer 41 becomes higher than the overload detection reference value E4 (FIG. 8(g)), with the result that the output voltage E5 of the operational amplifier 46 goes high (FIG. 8(h)), the value of integration E6 by the integrator exceeds the voltage E7 (FIG. 8(i)), and the output voltage E8 of the operational amplifier 56 goes low, and becomes lower than the reference voltage E1 (FIG. 8(j)).

As a result, the output of the comparator 58 becomes temporarily high, but becomes low following the drop of the voltage E3 that is proportional to the motor driving current (FIG. 8(g)), and then returns to low prior to the high level of the output of the comparator 33 (FIG. 8(d)). In other words, when the motor is started properly, the output of the comparator 33 goes low (FIG. 8(c)), and while the voltage E9 is maintained low (FIG. 8(e)), the voltage E3 that is proportional to the motor driving current returns to the constant value so that the output voltage E8 of the operational amplifier 56 goes high (FIG. 8(j)).

Since the comparator 58 compares the output voltage E8 with the reference voltage E1, and outputs a signal of low level, the voltage E9 is maintained low (FIG. 8(e)), with the result that the input current It flows from the constant power source (voltage Vcc) to the photocouplers 4a and 5a through the resistor 61. The gate currents If and Ig flow through the gates of the semiconductor switches 4 and 5 via the resistors 4b and 5b (FIG. 8(k), FIG. 8(l)), making the semiconductor switches 4 and 5 turn on and allowing the motor M to be driven continuously.

(b) Operation in the Event of an Overload

When an overload occurs after the motor has been started properly, the voltage E3 proportional to the motor driving current increases (FIG. 8(g)), with the result that the output voltage E5 of the operational amplifier 46 goes high (FIG. 8(h)), the value of integration E6 exceeds the voltage E7 (FIG. 8(i)), and the output voltage E8 of the operational amplifier 56 goes low, and becomes lower than the reference voltage E1 (FIG. 8(j)). The comparator 58 compares the output voltage E8 and the reference voltage E1, and the open collector output of the comparator 58 becomes non-conductive, that is, the output goes high (FIG. 8(d)).

When both of the outputs of the comparator 33 and the comparator 58 become high, the input current It to the photocouplers 4a and 5a is cut off. As a result, the gate currents If and Ig flowing through the gates of the semiconductor switches 4 and 5 are cut off, with the result that the semiconductor switches 4 and 5 turn off, cutting the motor driving current off and stopping the motor M; thus, it is possible to prevent damage to the driving mechanism driven by the motor M from further developing. When the output of the comparator 58 of the trip circuit 56 goes high (FIG. 8(d)), the constant voltage (Vcc) is applied to the output voltage E5 of the operational amplifier 46 that has been maintained low, through the resistor 61, the Zener diode 60, the diode 59 and the resistor 51 so that the voltage E6, which is inputted to the minus terminal of the operational amplifier 56, is continuously maintained at a voltage higher than the voltage E7 inputted to the plus terminal thereof (FIG. 8(i)).

As a result, the output voltage E8 of the operational amplifier 56 is maintained low (FIG. 8(j)), the output of the comparator 58 is maintained high, the input current It to the photocouplers 4a and 5a is maintained off continuously, the gate currents If and Ig are also maintained off (FIG. 8(k), FIG. 8(l)), and the semiconductor switches 4 and 5 turn off, thereby cutting off the motor driving current continuously.

(c) Operation in the Event of an Overload at the Time of Starting

In the event of an overload at the time of starting, since a starting current (motor driving current) that greatly exceeds the rated current of the motor M flows (FIG. 9(g)), the overload detection circuit 40 is activated and the output voltage E5 of the operational amplifier 46 goes high (FIG. 9(h)), with the result that the value of integration E6 exceeds the voltage E7 (FIG. 9(i)) and the output voltage E8 of the operational amplifier 56 is maintained low continuously (FIG. 9(j)).

The reference voltage E1 and the voltage E8 of the low level are inputted to the comparator 58, and if the overload state continues, the output of the comparator 58 is also maintained high continuously (FIG. 9(d)). When the output of the comparator 33 in the starting circuit 30 goes high, the input current It to the photocouplers 4a and 5a is cut off, and the gate currents If and Ig are cut off (FIG. 9(k) FIG. 9(l)) so that the semiconductor switches 4 and 5 turn off, thereby cutting off the motor driving current.

Figure 10:
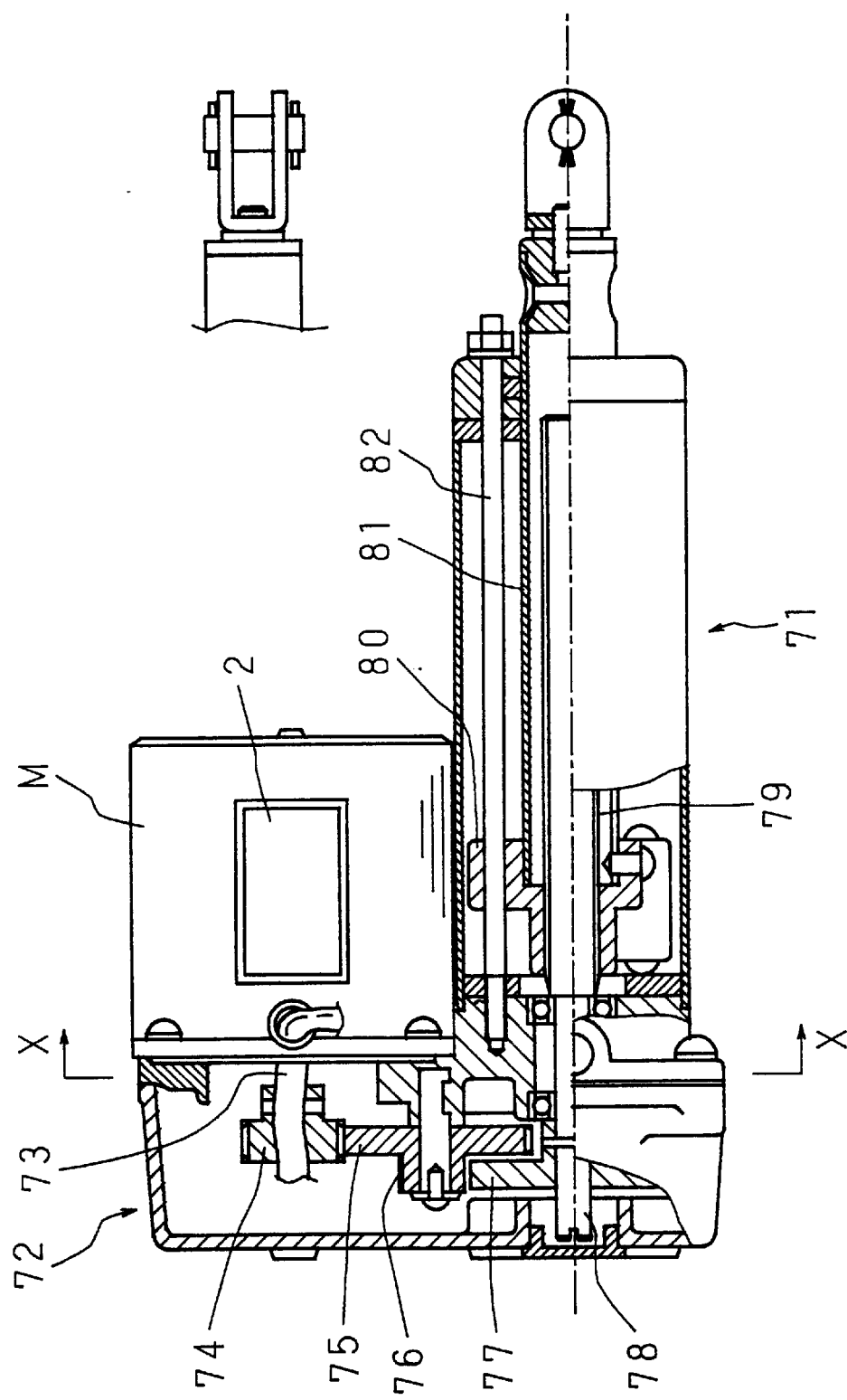
FIG. 10 is a partially exploded side view that shows an electric cylinder to which a speed reducer having the overload protection apparatus of the present invention is applied.
Figure 11:
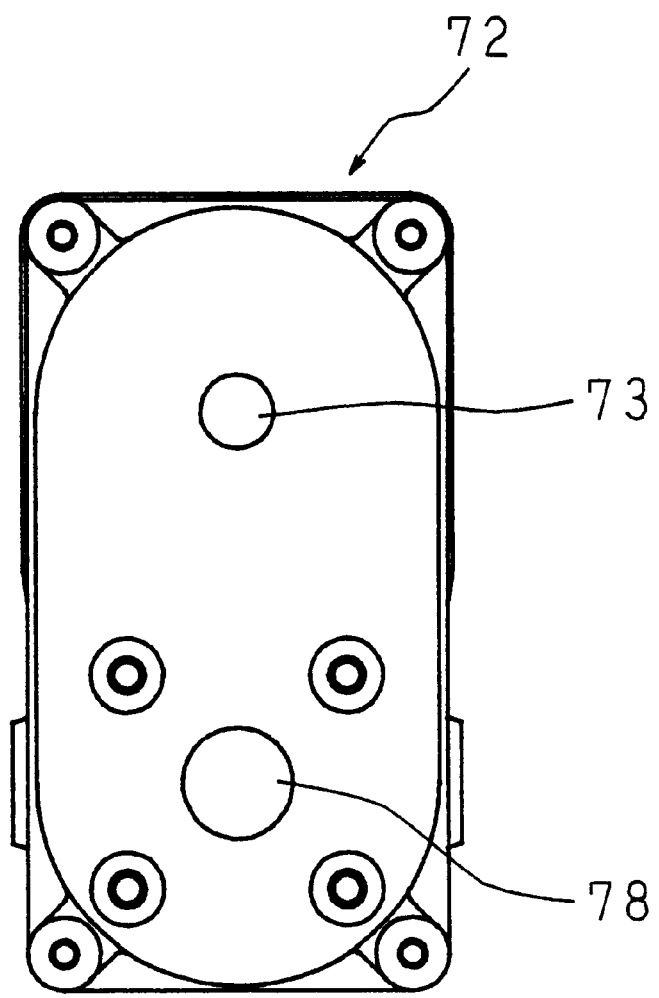
FIG. 11 is a cross-sectional view taken along line X—X of FIG. 10.

FIG. 10 is a partially exploded side view that shows the construction of an electric cylinder to which the present invention is applied. FIG. 11 is a cross-sectional view taken along line X—X of FIG. 10, and in the Figure, M represents a motor, reference numeral 71 is a cylinder section, and 72 is a speed reducer. An overload protection apparatus which is the same as that shown in FIG. 4 is installed inside the motor terminal box 2, and attached to the power supply lines of the motor M.

An output shaft 73 of the motor M is connected to a drive shaft 78 with reducing gears 74, 75, 76 and 77 being interpolated in between. A screw shaft 79 is coaxially connected to the drive shaft 78. A nut member 80 is engaged with the screw shaft 79, and a rod 81 is supported by the nut member 80 coaxially with the screw shaft 79, and the nut member 80 itself is externally fitted to a rotation stopping rod 82 placed in parallel with the screw shaft 79, in a manner so as to slide thereon.

In such an electric cylinder, the drive shaft 78 and the screw shaft 79 are forwardly or reversely driven by the motor M so as to rotate through the reducing gears 74 to 77 so that the nut member 80, which is stopped by the rotation stopping rod 82 from rotating, is shifted forward or backward, and the rod 81 is allowed to advance or retreat. Here, if a greater load is exerted on the rod 81, resulting in an overload in the motor M, and if this overload state continues for a predetermined time, the motor M is stopped, thereby preventing damage due to the overload.

As described above, in the present invention, in the event of an overload, the motor driving current is cut off by the semiconductor switch so that the motor current can be cut off more quickly as compared with a conventional electromagnetic contactor; thus, it is possible to reduce damage at the time of an overload trip.

Moreover, since the overload detection reference value is compensated in accordance with ambient temperature, it is possible to reduce unnecessary trips even in the case of a low ambient temperature, and consequently to detect an overload more appropriately. Furthermore, since the switch operation circuit is constituted by photocouplers, wiring can be simplified. Since the starting circuit is provided, no trip occurs even if a starting current exceeding the rated current is detected, thereby making it possible to start the motor properly.

Since the overload protection apparatus is housed in the motor terminal box, a small-size, compact speed reducer is achieved with ease in maintenance, inspection and exchange, and complex wiring processes are not required even if the overload protection apparatus is installed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An overload protection apparatus comprising:

a semiconductor switch installed in a power supply line for a motor;

an overload detection circuit including a current detector, installed in the power supply line, for detecting a motor driving current, an overload detection reference value setting circuit for setting an overload detection reference value and a first operational amplifier for comparing a voltage that is proportional to the motor driving current detected by the current detector with the overload detection reference value set by the overload detection reference value setting circuit, and for outputting a signal corresponding to the result of the comparison;

a starting circuit including a first comparator for comparing a voltage corresponding to the motor driving current upon starting the motor with a first reference value that is a reference voltage at the time of starting the motor, and for outputting a signal corresponding to the result of the comparison;

a trip circuit including a second operational amplifier for comparing a value of integration obtained by integrating an output of the first operational amplifier with a second reference value, and for outputting a signal corresponding to the result of the comparison, and a second comparator for comparing an output of the second operational amplifier with the first reference value, and for outputting a signal corresponding to the result of the comparison; and a switch operation circuit, installed between a constant-voltage source and an output end of the second comparator and/or an output end of the first comparator, for outputting a signal in response to the outputs of the first and second comparators so as to open and close the semiconductor switch.

2. The overload protection apparatus according to claim 1, wherein the overload detection reference value setting circuit comprises a temperature-sensitive resistor and a variable resistor that are series-connected to a constant-voltage source.

3. The overload protection apparatus according to claim 1, wherein the switch operation circuit comprises a photocoupler.

4. The overload protection apparatus according to claim 1, wherein the first comparator compares a charging voltage to a capacitor that is inputted from a series-connecting point between a resistor and the capacitor that are connected to a constant-voltage source with the first reference value so as to output a predetermined signal for a period until the charging voltage has exceeded the first reference value.

5. A speed reducer for reducing the number of revolutions of a motor connected to an input shaft, and for applying the resulting output to a loaded side, wherein an overload protection apparatus is housed in a motor terminal box, said overload protection apparatus comprising:

a semiconductor switch installed in a power supply line for the motor;

an overload detection circuit including a current detector, installed in the power supply line, for detecting a motor driving current, an overload detection reference value setting circuit for setting an overload detection reference value and a first operational amplifier for comparing a voltage that is proportional to the motor driving current detected by the current detector with the overload detection reference value set by the overload detection reference value setting circuit, and for outputting a signal corresponding to the result of the comparison;

a starting circuit including a first comparator for comparing a voltage corresponding to the motor driving current upon starting the motor with a first reference value that is a reference voltage at the time of starting the motor, and for outputting a signal corresponding to the result of the comparison;

a trip circuit including a second operational amplifier for comparing a value of integration obtained by integrating an output of the first operational amplifier with a second reference value, and for outputting a signal corresponding to the result of the comparison, and a second comparator for comparing an output of the second operational amplifier with the first reference value, and for outputting a signal corresponding to the result of the comparison; and a switch operation circuit, installed between a constant-voltage source and an output end of the second comparator and/or an output end of the first comparator, for outputting a signal in response to the outputs of the first and second comparators so as to open and close the semiconductor switch.

6. The speed reducer according to claim 5, wherein the overload detection reference value setting circuit comprises a temperature-sensitive resistor and a variable resistor that are series-connected to a constant-voltage source.

7. The speed reducer according to claim 5, wherein the switch operation circuit comprises a photocoupler.

8. The speed reducer according to claim 5, wherein the first comparator compares a charging voltage to a capacitor that is inputted from a series-connecting point between a resistor and the capacitor that are connected to a constant-voltage source with the first reference value so as to output a predetermined signal for a period until the charging voltage has exceeded the first reference value.

* * * * *

UNITED STATES PATENT AND TRADEMARK OFFICE
CERTIFICATE OF CORRECTION

PATENT NO. : 6,252,752 B1  Page 1 of 1
DATED : June 26, 2001
INVENTOR(S) : Tsuneo Nagahama It is certified that error appears in the above-identified patent and that said Letters Patent is hereby corrected as shown below:

Title page,
Item [30], correct the date of the FOREIGN APPLICATION PRIORITY DATE from "May 2, 1999" to -- February 5, 1999 --.

Signed and Sealed this

Twenty-sixth Day of February, 2002

Attest:

Attesting Officer

JAMES E. ROGAN
Director of the United States Patent and Trademark Office